United States Patent Office 2,742,450
Patented Apr. 17, 1956

2,742,450
NITROGENOUS CONDENSATES

Robert S. Yost, Oreland, and Robert W. Auten, Jenkintown, Pa., assignors to Rohm & Haas Company, Philadelphia, Pa., a corporation of Delaware No Drawing. Application July 14, 1952,
Serial No. 298,848

9 Claims. (Cl. 260—70)

This invention relates to condensates prepared by starting with urea, polyalkylenepolyamines and formaldehyde.

It has been proposed that urea, formaldehyde, and various amines having reactive hydrogen on the amino nitrogen thereof be reacted together to form resinous condensates in which the amine forms a part of the condensate. It has also been shown that polyethylenepolyamines react with urea to form thermoplastic resins on the one hand and cyclic urea derivatives on the other. It has been shown, for example, that imidazolidones can be formed from polyamines having one, two, or three ethylene groups between pairs of nitrogen atoms. In contrast to these previously known materials this invention deals with cocondensates which are made from urea, certain polyethylenepolyureas, and formaldehyde and which have unique properties.

For purposes of this invention there are reacted by condensing together formaldehyde, urea, and polyurea formed by reacting together urea and a polyethylenepolyamine of the formula $$NH_2(ANH)_nH$$

where A is an alkylene group of two to three carbon atoms and $n$ is an integer from 2 to 5. In forming said polyurea at least one half mole of urea is used for every —NH— group of the polyamine up to about one mole of urea per —NH— group.

The proportion of polyurea to urea, both of which are reacted with formaldehyde, is best defined in terms of ureido groups in the polyurea per mole of urea, from 0.05 to 0.5 ureido unit per mole of urea giving condensates having the required properties.

For the preparation of the condensates of this invention there is used from 0.5 to 4 moles of formaldehyde for each hydrogen-bearing carbamide nitrogen, whether in the urea or the polyurea. A ratio of one to two moles of formaldehyde per said carbamide nitrogen is preferred.

For preparing the polyureas to be cocondensed there are mixed one or more of the polyethylenepolyamines having two, three, four or five ethylene groups with about one half to about one mole of urea for each —NH— group thereof. The mixture is heated between about 90° C. and 190° C. Ammonia is evolved. There result chiefly polyethylenepolyureas which have reactive ureido groups and which are still distinctly basic. In place of polyethylenepolyamines there may be used equivalent polypropylenepolyamines or mixed ethylenepropylenepolyamines, such as N,N'-diaminoethylpropylenediamine.

The above polyalkylenepolyureas are mixed with urea in the proportions stated above and the mixture is reacted with formaldehyde, supplied, for example, by a formalin solution of commerce. These solutions contain 30% to 50% of this aldehyde. There may also be used a revertible polymer, such as paraformaldehyde, this being best used in the presence of some aqueous formaldehyde.

The cocondensation is carried out between about 75° and about 110° C., preferably between 80° and 105° C., in the presence of water. The pH of mixture being reacted is adjusted, if necessary, to a value between 7 and 9. Reaction at this pH is continued until the urea and polyurea form methylol derivatives. At the above temperatures formation of methylol compounds is essentially complete in 10 to 30 minutes. The pH of the reaction mixture is now adjusted to a value between 4.5 and 6.5, best from 5 to 6, by addition of acid, such as formic acid or a dilute solution of hydrochloric acid or phosphoric acid or the like. Reaction is continued until an aqueous 42-46% solution of the resulting condensate has a viscosity of B to T at 25° C. on the Gardner-Holdt scale and preferably a viscosity of H to R.

The following examples are cited to illustrate the procedure. Parts are by weight.

Example 1

(a) Tetraethylenepentamine, as available commercially, in an amount of 94.5 parts (0.5 mole) and 150 parts of urea are mixed and heated. It is noticed that as the temperature of the mixture reaches 97° C., evolution of ammonia begins. Heating is continued with the temperature being gradually raised to 145° C. over a 2.5 hour period. The mixture is cooled to about 125° C. and 100 parts of water are cautiously added. There is thus formed 310.8 parts of a solution of tetraethylenepolyurea. It contains 68.9% of solids, has a viscosity of E— on the Gardner-Holdt scale, and has a pH value of 10.7.

(b) There are mixed 46.8 parts of the above polyurea solution and 410 parts of aqueous 36.6% formaldehyde solution. The pH of this mixture is adjusted to 7.4 with 0.34 part of 50% formic acid. Thereto urea is added in an amount of 120 parts. This mixture is heated to 80° C., at which temperature an exothermic reaction begins, carrying the temperature to 89° C. The mixture is then heated to refluxing temperature (105° C.), where it is held for ten minutes. The mixture is cooled to 85° C. and the pH thereof is adjusted to 5.4 by the addition of 2.25 parts of aqueous 50% formic acid solution. The mixture is stirred and heated at 85° C. for 5.5 hours. During this time the viscosity of the reaction mixture increases from A1 to H— on the Gardner-Holdt scale. The pH of the reaction mixture is held between 5.4 and 5.65 by occasional additions of small amounts of 50% formic acid. The pH is now raised to 6.0 by addition of aqueous 10% sodium hydroxide solution and heating is continued at about 85° C. while the viscosity of the reaction mixture advances to J—. More sodium hydroxide solution is added to bring the pH to 6.3 and the viscosity is carried to Q. The solution is then cooled with an ice bath and made slightly alkaline by addition of sodium hydroxide solution. There was thus obtained 554.6 parts of a solution containing 43.3% of solids and having a specific gravity of 1.185, a viscosity of Q, and a pH of 7.7. This solution is diluted with water to a solids content of 35% and filtered with the aid of diatomaceous earth. It then has a specific gravity of 1.145, a viscosity of E, and a pH of 7.6.

The resinous condensate thus prepared is highly effective for imparting wet strength to paper. It may be added to the beater or at other places in the paper manufacturing process.

Example 2

(a) There are mixed 109.5 parts of triethylenetetramine and 180 parts of urea. The mixture is stirred and heated. Evolution of ammonia begins above about 93° C. and continues as the temperature is raised to 142° C. over a period of 1.75 hours. The reaction mixture is cooled to 120° C. and 100 parts of hot water is cautiously added. There is thus formed 347.5 parts of solution containing 71.5% of polyethylenepolyurea. The solution has a viscosity of E on the Gardner-Holdt scale and a pH of 10.6.

(b) There are mixed 46.8 parts of this solution and 410 parts of aqueous 36.6% formaldehyde solution. The pH of the mixture is brought to 7.1 by addition of aqueous 50% formic acid solution. Urea (120 parts) is added and the mixture is heated to about 80° C., whereupon an exothermic reaction takes place, carrying the temperature of the mixture to 88° C. without the aid of external heat. Heating is resumed to carry the temperature to 104° C., where it is held for 10 minutes. The mixture is cooled to 85° C. and treated with 50% formic acid to bring the pH to 5.2. The mixture is stirred and heated at 85° C. for 5.5 hours. The viscosity of the reaction mixture increases from $A_1$ to P and the pH rises from 5.2 to 6.0. The mixture is cooled to 25° C. and is approximately neutralized with 10% sodium hydroxide solution. There is thus obtained a solution of 555.1 parts, containing 43.9% of solids and having a specific gravity of 1.186 and a viscosity of P—. This solution is diluted with water to 35% solids and is filtered through diatomaceous earth. The diluted solution has a specific gravity of 1.144, a Gardner-Holdt viscosity of D+, and a pH of 7.4. It is useful as an additive to the beater in paper manufacture to impart a high degree of wet strength to paper.

*Example 3*

(a) There are mixed 103 parts of diethylenetriamine and 180 parts of urea. The mixture is heated with evolution of ammonia, which is first noticed at 89° C., until a temperature of 145° C. is reached after 2.2 hours. The reaction mixture is cooled to 120° C. and treated cautiously with 100 parts of water. There is thus formed a solution amounting to 335.6 parts and containing 69.7% of essentially diethylenetriurea. After this product stands 16 to 20 hours, it becomes a white, semi-solid paste.

(b) There are mixed 44.4 parts of the above polyurea solution containing the diethylenetriamine-urea condensate, and 224 parts of aqueous 36.2% formaldehyde solution. The pH of the mixture is brought to 7.0 by adding 50% formic acid. Urea (60 parts) is added and the resulting mixture is heated. At about 80° C. an exothermic reaction occurs and carries the temperature of the mixture to 88° C. The temperature thereof is held at 85-88° C. for 10 minutes. The pH is adjusted to 5.2 by adding 50% formic acid. The mixture is stirred and heated at 85° C. for 4.5 hours, during which time its viscosity increases from $A_1$ to L+ and the pH is controlled between 5.2 and 5.7 by several small additions of 50% formic acid. The resin solution is rapidly cooled to about 30° C. and is treated with 10% sodium hydroxide solution to yield 315 parts of a solution of the condensate of urea, the polyurea, and formaldehyde. This solution contains 44.9% of solids and has a viscosity of M and a specific gravity of 1.189. As in previous examples, adjustment is made to give a solution of 35% solids and this solution is filtered. It has a viscosity of D, a pH of 7.3, and a specific gravity of 1.141. It is likewise useful as a wet strength agent in paper making.

We claim:

1. A process for preparing nitrogenous condensates which comprises preparing a polyurea by heating together with evolution of ammonia, for a period of about one and three-quarters hours to about two and one-half hours at a temperature rising from about 90° C. at the beginning of the period to at least about 142° to 145° C. at the end of the period, a mixture of urea and a polyalkyenepolyamine of the formula $$NH_2(ANH)_nH$$

where A is an alkylene group of two to three carbon atoms and $n$ is an integer from two to five, there being reacted about one half to one mole of urea per —NH— group in said polyalkylenepolyamine and there being produced by the reaction a polyurea having reactive ureido and imino groups which polyurea is distinctly basic, mixing and reacting together between about 75° and about 110° C. at a pH from 7 to 9 in the presence of water said basic polyurea, urea, and formaldehyde, there being used from 0.05 to 0.5 ureido group in said polyurea per mole of urea and 0.5 to 4 moles of formaldehyde per hydrogen-bearing carbamide nitrogen in both urea and polyurea, whereby methylol derivatives are formed, adjusting said methylol compounds to a pH between 4.5 and 6.5 and condensing said methylol compounds until an aqueous 42–46% solution thereof has a viscosity of B to T at 25° C. on the Gardner-Holdt scale.

2. A process for preparing nitrogenous condensates which comprises preparing a polyurea by heating together with evolution of ammonia, for a period of about one and three-quarters hours to about two and one-half hours at a temperature rising from about 90° C. at the beginning of the period to at least about 142° to 145° C. at the end of the period, a mixture of urea and a polyalkylenepolyamine of the formula $$NH_2(ANH)_nH$$

where A is an alkylene group of two to three carbon atoms and $n$ is an integer from two to five, there being reacted about one half to one mole of urea per —NH— group in said polyalkylenepolyamine and there being produced by the reaction a polyurea having reactive ureido and imino groups which polyurea is distinctly basic, mixing and reacting together between about 80° and about 105° C. at a pH from 7 to 9 in the presence of water said basic polyurea, urea, and formaldehyde, there being used from 0.05 to 0.5 ureido group in said polyurea per mole of urea and one to two moles of formaldehyde per hydrogen-bearing carbamide nitrogen in both urea and polyurea, whereby methylol derivatives are formed, adjusting said methylol compounds to a pH between 5 and 6 and condensing said methylol compounds until an aqueous 42–46% solution thereof has a viscosity of H to R at 25° C. on the Gardner-Holdt scale.

3. A process for preparing nitrogenous condensates according to claim 2 wherein the polyalkylenepolyamine is triethylenetetramine.

4. A process for preparing nitrogenous condensates according to claim 2 wherein the polyalkylenepolyamine is tetraethylenepentamine.

5. A process for preparing nitrogenous condensates according to claim 2 wherein the polyalkylenepolyamine is diethylenetriamine.

6. Products obtained according to the process of claim 1.

7. Products obtained according to the process of claim 3.

8. Products obtained according to the process of claim 4.

9. Products obtained according to the process of claim 5.

References Cited in the file of this patent

UNITED STATES PATENTS

| | | |
|---|---|---|
| 2,400,016 | Meyer | May 7, 1946 |
| 2,517,128 | Meunier et al. | Aug. 1, 1950 |
| 2,616,874 | Yost et al. | Nov. 4, 1952 |
| 2,657,132 | Daniel et al. | Oct. 27, 1953 |